B-B

INVENTOR.
ERIK HELLMAN

INVENTOR.
ERIK HELLMAN
BY
Jennings Bailey J

United States Patent Office 3,448,008
Patented June 3, 1969

3,448,008
CONTROL RODS FOR NUCLEAR REACTORS
Erik Hellman, Irsta, Sweden, assignor to Allmänna Svenska Elektriska Aktiebolaget, Vasteras, Sweden, a Swedish corporation
Filed Sept. 7, 1967, Ser. No. 666,026
Claims priority, application Sweden, Sept. 16, 1966, 12,468/66
Int. Cl. G21c 7/10
U.S. Cl. 176—86  8 Claims

ABSTRACT OF THE DISCLOSURE

A control rod for nuclear reactors comprising absorber plates with a plurality of hollow spaces containing neutron absorbing material. Each plate is built up of one or a small number of plate-shaped pieces of material in which the hollow spaces are drilled. The spaces extend substantially perpendicular to the longitudinal direction of the rod and are in communication with each other through pressure equalizing channels.

BACKGROUND OF THE INVENTION

Field of the invention

The present invention relates to a control rod for nuclear reactors.

The prior art

Such a rod comprises a number of absorber plates supported by a connecting rod, the absorber material being applied in several hollow spaces extending substantially perpendicular to the longitudinal direction of the rod and hermetically sealed from the surroundings of the control rods.

With the construction described for instance, the absorber elements will be relatively short and furthermore, with vertically arranged control rods which are the most usual, they will be horizontally placed and the weight of the absorber material, which is usually powdered, will therefore cause negligible unevenness in packing density. With known control rods manufactured according to this principle, the absorber plates are built up of a great number of tubular absorber elements arranged in the transverse direction of the control rod. These elements are usually placed in control grooves in a central base element and in an outer frame, every tenth element, for instance, being welded to the base element or frame, while the other elements are loose in the groove. This construction does not normally fulfil the demands for rigidity required in an absorber plate. Such a plate is usually rather long, for example 4 metres, and must be pushed into a narrow space with very little clearance. In certain cases, for example upon a rapid shutting down of the reactor, it must also be displaced extremely rapidly and is thus subjected to great stress. The known construction is also relatively expensive to manufacture since it requires a considerable number of different operations.

SUMMARY OF THE DISCLOSURE

The object of the present invention is to produce a control rod which has many advantages over control rods in which the absorber material is applied in tubular elements arranged in the longitudinal direction of the rod.

SUMMARY OF THE INVENTION

According to the present invention these disadvantages are avoided by constructing each absorber plate out of one single plate-shaped piece of material, or a small number of such pieces, in which hollow spaces are arranged to hold the absorber material. The hollows may suitably consist of drilled channels. This embodiment provides a very rigid construction and permits good manufacturing tolerances and considerably lower manufacturing costs.

A powdered material, for example boron carbide, is normally used as absorber. When this material is subjected to radiation helium gas is produced and a high internal over-pressure may arise in the hollows. In the described known construction each absorber element is hermetically sealed. Since the absorber plates are not subjected to continuous radiation, a few of the elements will be subjected to a relatively high internal gas pressure, whereas the gas pressure in the other elements will be reasonable. The construction proposed according to the invention, however, enables complete equalisation of the helium pressure since the hollows are closed by means permitting the gas to flow between the various hollows in an absorber plate. Thus a lower maximum pressure is obtained in the hollows and the strain on the rod is decreased. The closing means may suitably consist of a loosely-fitting bar placed in a slot arranged in the edge surface of the plate remote from the centre line of the rod. Even better equalisation of the gas pressure in the control rod is obtained by arranging pressure-equalisation channels between hollows in different absorber plates. An extra expansion chamber for the helium gases can also easily be obtained according to a further development of the invention, where the hollows in the absorber plates are arranged to communicate through a connecting channel with the space formed inside the connecting rod when this is made tubular.

BRIEF DESCRIPTION OF THE DRAWINGS

The invention will be further described with reference to the accompanying drawings which show different embodiments of the invention.

The control rod shown in FIGURES 1 and 2 is substantially manufactured from stainless steel and consists of an absorber part 2 supported by a vertically arranged connecting rod 1. The absorber part consists of four absorber plates 3–6 forming a right-angled cross, the centre line of which coincides with that of the connecting rod. The absorber plates 3 and 5 are made from one piece of material on to which the plates 4 and 6 have been welded. The plates are provided with a considerable number of drilled channels 7 extending perpendicular to the longitudinal direction of the rod. The channels are filled with a powdered absorber material 8, for example boron carbide. In the edge surface of each absorber plate, remote from the centre line of the rod, a slot 9 is arranged into which is inserted a loosely-fitting bar 10 with semi-circular cross section. The bar is held in the slot by pressing the side walls of the slot on both sides of the bar around the bar and welding them. This method of closing the drilled channels permits the helium gas formed by the absorber material due to radiation to flow between the various channels in the plate as indicated by the arrows in FIG. 4 so that a complete equalisation of the gas pressure within the plate takes place. However, by welding the side walls of the slot, the absorber hollows are made gas-tight with respect to the control rod surroundings. In order to guide the control rod into the relatively narrow gaps between the fuel rods of the reactor, it is provided at the top with graphite plates 11. Furthermore, it is provided with a hole 12 for mounting and replacement of the rod. At the lower end the rod is provided with a connecting head 13 through which the rod can be connected to a control device. FIGURES 3 and 6 (of which FIGURE 3 shows a part of control rod in horizontal rather than vertical position) show schematically how the absorber hollows 7 in different plates can be connected to each other by means of pressure-equalising channels 14 so that the pressure can be equalised between different absorber plates. It is also clear how the hollows are connected to the space inside the tubular connecting rod 1 by means of a connecting channel 15. In this case a cylindrical cup-shaped part 16 is attached to the lower part of the absorber plate 2, to which part 16 the connecting rod is welded at the joint 17. By means of this arrangement a considerably increased expansion space is easily obtained for the helium gases formed by the absorber material during radiation. This in turn helps to decrease the mechanical stresses on the rod.

Figure 1:
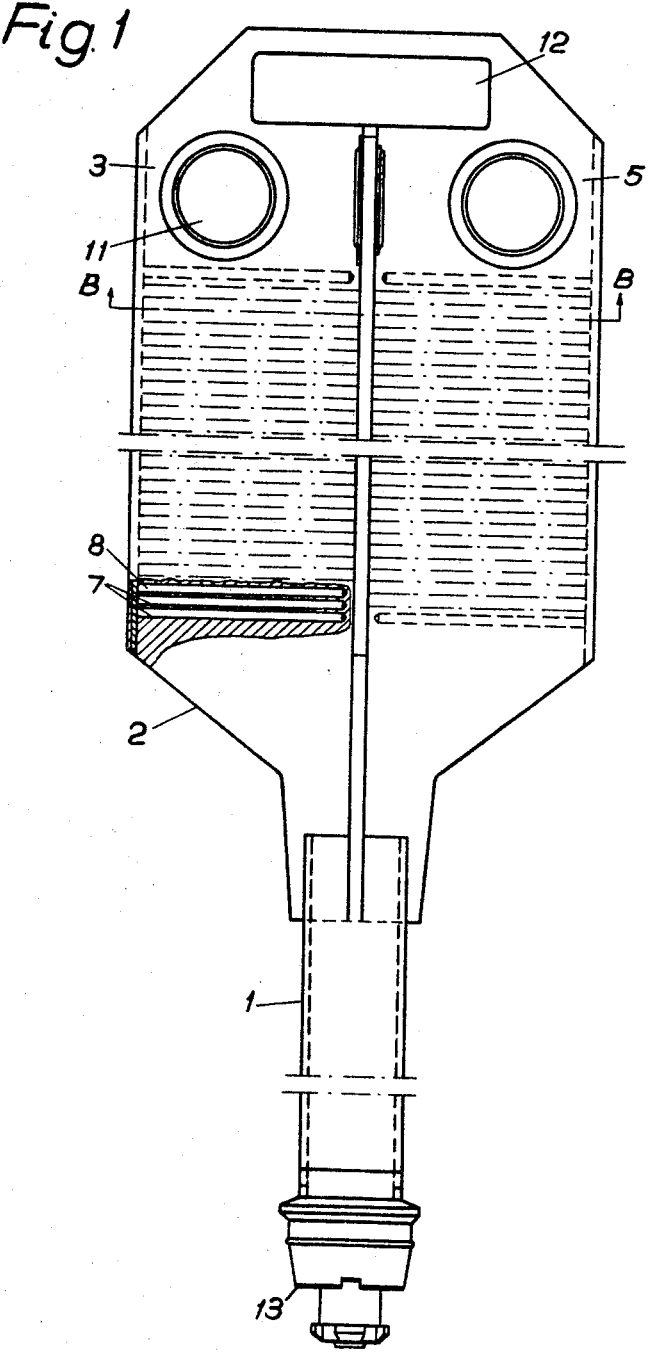
FIGURE 1 shows a side view, partly in section, and FIGURE 2 a cross section of a control rod according to the invention.
Figure 2:
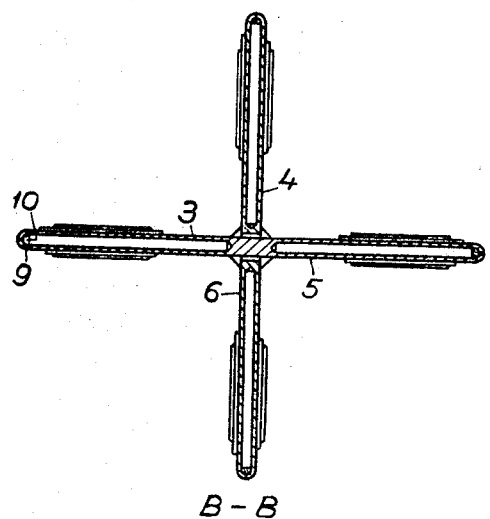
Figure 3:
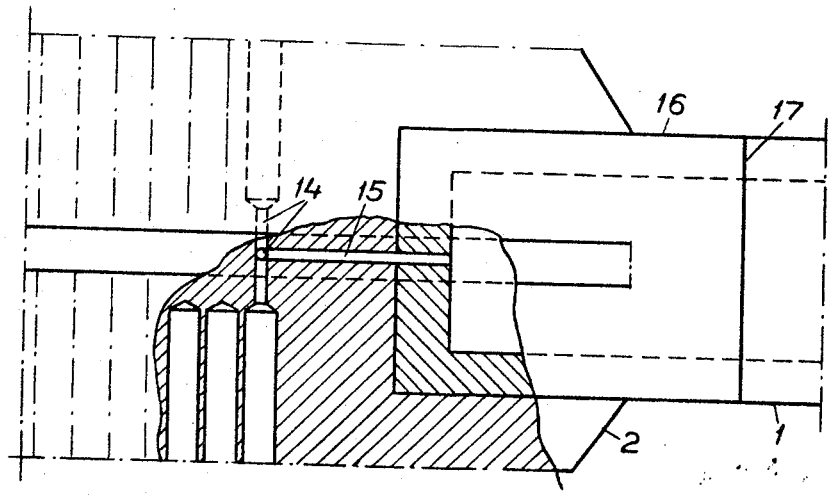
FIGURE 3 shows a detail of an alternative embodiment, where the absorber hollows communicate with the space inside a tubular connecting rod.
Figure 4:
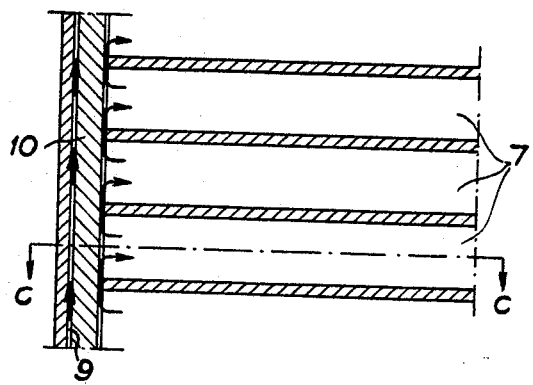
FIGURE 4 shows an enlargement of a part of FIGURE 1.
Figure 5:
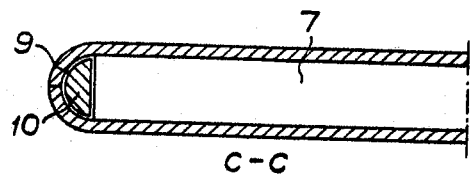
FIGURE 5 is a cross-section on the line c—c of FIGURE 4.
Figure 6:
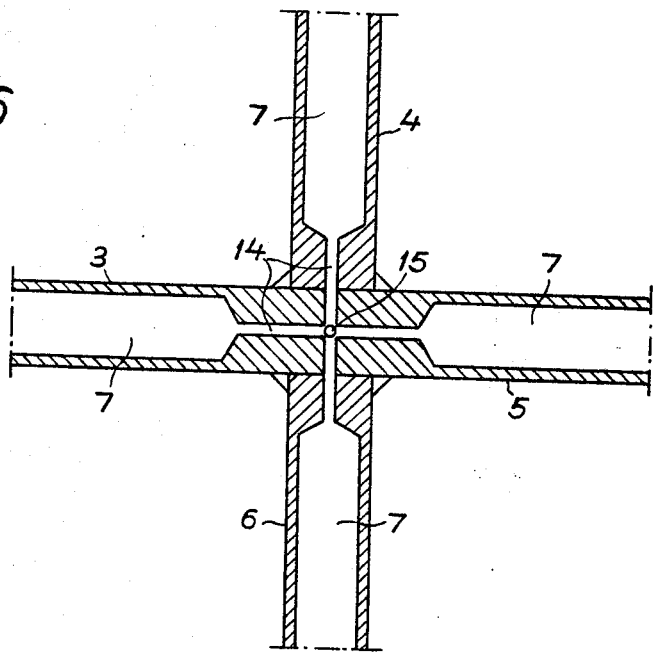
FIGURE 6 is a cross-section through FIGURE 3.

I claim:

1. Control rod for nuclear reactors, comprising a connecting rod, a plurality of absorber plates supported by said connecting rod, each of said absorber plates having a plurality of hollow spaces containing neutron absorber material, said hollow spaces extending substantially perpendicular to the longitudinal direction of said connecting rod and being hermetically sealed from the control rod surroundings, each absorber plate being built up of a small number of plate-shaped pieces of material in which said hollow spaces are arranged.

2. Control rod according to claim 1, in which said hollow spaces consist of drilled channels.

3. Control rod according to claim 1 in which means are provided closing said hollow spaces; said closing means permitting the flow of gas between the various hollow spaces in an absorber plate.

4. Control rod according to claim 3, in which said closing means comprises a bar placed in a slot arranged in the edge surface of the absorber plate remote from the centre line of the control rod.

5. Control rod according to claim 4, in which the side walls on both sides of the slot are pressed round the bar and welded together in a gas-tight manner.

6. Control rod according to claim 1, in which pressure-equalizing channels are arranged between hollow spaces in different absorber plates.

7. Control rod according to claim 1, in which said hollows arranged in the absorber plates communicate through a connection channel with an expansion chamber arranged inside the connecting rod and separated from the control rod surroundings.

8. Control rod according to claim 1, in which the connecting rod is tubular.

References Cited

UNITED STATES PATENTS 3,234,104  2/1966  Gale et al. _____ 176—86

FOREIGN PATENTS 1,435,216  3/1966  France.
859,548  1/1961  Great Britain.

BENJAMIN R. PADGETT, *Primary Examiner.*

H. E. BEHREND, *Assistant Examiner.*